UNITED STATES PATENT OFFICE.

WILLIS EUGENE EVERETTE, OF TACOMA, WASHINGTON.

PROCESS OF MAKING HYDROCHLORIC ACID.

No. 805,009.           Specification of Letters Patent.           Patented Nov. 21, 1905.

Application filed February 24, 1904. Serial No. 195,076.

*To all whom it may concern:*

Be it known that I, WILLIS EUGENE EVERETTE, a citizen of the United States, and a resident of Tacoma, in the county of Pierce and State of Washington, have invented certain new and useful Improvements in the Manufacture of Hydrochloric Acid, of which the following is a specification.

The object of my invention is to simplify and cheapen the production of hydrochloric acid. To accomplish this result, I have devised a method by which hydrogen and chlorin are directly combined without danger of explosion and at once pass into an aqueous solution, thereby forming commercial hydrochloric or muriatic acid. By this process also I obtain considerable quantities of free nitrogen and free oxygen, which may be, if desired, immediately utilized in the formation of nitric acid or nitrates of the alkalies. In bringing about this result I obtain the necessary oxygen and nitrogen from the atmospheric air and the necessary hydrogen from water, so that the materiels employed are quite inexpensive, it being necessary only to provide the desired quantity of chlorin gas either as a gas or combined as a chlorid of any suitable alkali.

The forces employed in carrying out this process are three—the sustaining and propelling power of a jet of compressed air, the intense cold or crymic condition obtainable by the use of a jet of liquid air under normal expansion, and the intense thermic energy contained in silica when kept constantly in a state of incandescence.

As a short and easy example of my improved process I first supply a determined quantity of steam, chlorin gas, and preferably, also, the pulverized chlorid of some alkali, to a jet of compressed air of sufficient power to receive and hold these substances in suspension and convey them through a confined space a suitable and convenient distance for the rest of the operation. I then cause this traveling mixture of compressed air, steam, chlorin gas, and the chlorid, if present, to pass through a fine jet of liquid air descending under normal expansive conditions, by which the entire mixture is at once reduced to an intensely-cold or crymic condition, while at the same time a small quantity of the liquid air is carried on with the other substances by the continuing force of the compressed air. Immediately or as soon as physically practicable I cause this intensely-cold traveling mixture to impinge against blocks or other forms of silica or silica-coated material maintained constantly in a state of white heat or incandescence, whereby each particle of the mixture is immediately disrupted into its constituent atoms and new combinations are formed, according to the law of mutual affinities between various atoms. For example, the chlorin at once seizes upon its equivalent of hydrogen liberated from the steam, forming hydrochloric-acid gas, while the nitrogen and oxygen thus liberated combine with such alkalies as may be present, thus forming nitrates, or if no alkali is present the nitrogen and oxygen can be drawn off as free gases, with possibly some nitrous oxid. It is important that the hydrochloric-acid gas should at once pass into solution, so that it may be drawn off as commercial hydrochloric acid, and this is accomplished either by the presence of an excess of water in the original mixture as compared with the chlorin or by the introduction of a steam-jet simultaneously with the disruption above mentioned, the rapid solubility of the gas in water effectually safeguarding the process from the heat otherwise generated by the combination of chlorin and hydrogen. The excess of water is also useful in causing part of the liberated nitrogen to combine with some of the nitrogen and oxygen which have not combined with alkali to form a nitrate to form nitric acid. Whatever free nitrogen remains can be drawn off. As the liquids thus formed—hydrochloric acid and nitric acid—can be easily separated and drawn off from the nitrates, if such are formed, it is obvious that the above process is not only an easy and direct process for the formation of the substances mentioned, but that it is comparatively inexpensive, as each of the products obtained is drawn either from the air or from water, and therefore practically without expense for materials. As before stated, the only condition of safety required is that chlorin should not be present in excess, thus avoiding the well-known dangers arising from an excess of chlorin in the presence of nitrogen or such excess in hydrochloric-acid gas in the presence of nitric acid. This danger is very easily avoided, and by causing the explosions of minute quantities to take place with great frequency a practically-continuous operation is secured.

While it is preferable to have a chlorid of some alkali present in the original mixture, the process can be readily applied without such chlorid.

I claim—

1. A process of producing hydrochloric acid, which consists, first: in reducing a mixture of water, chlorin gas and compressed air to an intense crymic condition by contact with liquid air; second: subjecting said mixture while still in said intense crymic condition, to contact with intense heat by impact against incandescent silica, whereby the nitrogen and oxygen are liberated, while the chlorin combines with a portion of the liberated hydrogen to form hydrochloric-acid gas; third: dissolving said gas in water thereby forming hydrochloric acid, and collecting the same for commercial use.

2. A process of producing hydrochloric acid which consists, first: in reducing a mixture of water, chlorin gas, compressed air and chlorid of an alkali to an intense crymic condition with liquid air; second: subjecting said mixture, while still in said intense crymic condition, to contact with intense heat by impact against incandescent silica, whereby a disruption of said substances is caused; third: collecting a portion of said substances recombined with the aid of water as hydrochloric acid.

WILLIS EUGENE EVERETTE.

Witnesses:
W. P. PREBLE, Jr.,
ANNA H. VAN HOVENBERG.